US012717767B2

(12) United States Patent
Dong et al.

(10) Patent No.: US 12,717,767 B2
(45) Date of Patent: Aug. 25, 2026

(54) METHOD AND TERMINAL FOR GENERATING TERMINAL LOG BY INTEGRATION OF ELECTRONIC SENSOR DATA ACQUIRED BY THE TERMINAL

(71) Applicant: Huawei Technologies Co., Ltd., Shenzhen (CN)

(72) Inventors: Zhenhua Dong, Shenzhen (CN); Liangwei Wang, Shenzhen (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1138 days.

(21) Appl. No.: 16/945,189

(22) Filed: Jul. 31, 2020

(65) Prior Publication Data

US 2020/0364204 A1 Nov. 19, 2020

Related U.S. Application Data

(63) Continuation of application No. 14/104,822, filed on Dec. 12, 2013, now abandoned, which is a (Continued)

(30) Foreign Application Priority Data

Sep. 26, 2012 (CN) ........................ 201210363473.9

(51) Int. Cl.
*G06F 16/23* (2019.01)
*G06F 11/30* (2006.01)

(Continued)

(52) U.S. Cl.
CPC ...... *G06F 16/2358* (2019.01); *G06F 11/3013* (2013.01); *G06F 11/3058* (2013.01);

(Continued)

(58) Field of Classification Search
None
See application file for complete search history.

(56) References Cited

U.S. PATENT DOCUMENTS 7,069,003 B2 6/2006 Lehikoinen et al.
7,509,539 B1 * 3/2009 Denefleh ............... G06F 11/079 714/48

(Continued)

FOREIGN PATENT DOCUMENTS

CN 1868202 A 11/2006
CN 101599980 A 12/2009

(Continued)

OTHER PUBLICATIONS

Ganti et. al., "Mobile Crowdsensing: Current State and Future Challenges", IEEE Communications Magazine, Nov. 2011 (Year: 2011).*

(Continued)

*Primary Examiner* — Aleksandr Kerzhner
*Assistant Examiner* — Anugeetha Kunjithapatham
(74) *Attorney, Agent, or Firm* — Leydig, Voit & Mayer, Ltd.

(57) ABSTRACT

Embodiments of the present invention provide a method for generating a terminal log and a terminal. The method includes: obtaining sensor information and/or use information of a mobile terminal; generating first log information according to the sensor information and/or the use information; receiving second log information input by a user; and combining the first log information with the second log information to generate terminal log information; the terminal may receive modification information input by the user and update the first log information according to the modification information. In the embodiments of the present invention, by obtaining related information, a log is automatically generated; and in combination with a modification (Continued)

of a user and a log written by the user, it is ensured that log content required by the user is accurately obtained.

15 Claims, 4 Drawing Sheets

Related U.S. Application Data continuation of application No. PCT/CN2013/074191, filed on Apr. 15, 2013.

(51) Int. Cl.
*G06F 11/34* (2006.01)
*G06F 16/9035* (2019.01)

(52) U.S. Cl.
CPC ...... *G06F 11/3476* (2013.01); *G06F 16/9035* (2019.01); *G06F 11/3072* (2013.01); *G06F 11/3075* (2013.01); *G06F 11/3082* (2013.01); *G06F 11/3438* (2013.01)

(56) References Cited

U.S. PATENT DOCUMENTS 8,316,046 B2* 11/2012 Huang .................. G06F 16/248 707/711
8,539,380 B2* 9/2013 Krumm .................. H04L 67/52 715/857
8,717,461 B2* 5/2014 Gallagher ........... G06F 16/2477 348/231.5
8,805,929 B2* 8/2014 Erol .................... G06F 16/9562 709/227
8,832,116 B1* 9/2014 Chu ................... G06Q 10/0637 707/748
8,838,516 B2* 9/2014 Kunjithapatham .......................... G06F 16/9535 706/45
8,923,994 B2* 12/2014 Laikari .................. G16H 20/30 700/91
9,582,755 B2* 2/2017 Ding ........................ G06N 5/02
9,665,703 B2* 5/2017 Turgeman ............... G06F 21/32
2005/0075097 A1 4/2005 Lehikoinen et al.
2005/0105374 A1* 5/2005 Finke-Anlauff ........ G06F 16/54 365/232
2007/0143842 A1* 6/2007 Turner .................. G06F 21/552 726/22
2007/0282920 A1 12/2007 Egi et al.
2007/0299631 A1* 12/2007 Macbeth ............. G06F 11/3476 702/182
2008/0109418 A1 5/2008 Shapiro et al.
2009/0210516 A1* 8/2009 Roskowski ............ G06Q 10/06 709/224
2010/0029294 A1* 2/2010 Matsuoka ............. H04L 67/535 455/563
2010/0075652 A1* 3/2010 Keskar .............. H04M 1/72454 455/418
2010/0274568 A1* 10/2010 Huhtala .............. G07F 17/3239 705/1.1
2010/0299294 A1 11/2010 Mott et al.
2011/0276396 A1* 11/2011 Rathod ................ G06Q 20/384 707/706
2012/0117499 A1* 5/2012 Mori ..................... G06F 3/0481 715/765
2012/0185419 A1* 7/2012 Kuhn ..................... G06N 5/048 706/54
2012/0239173 A1* 9/2012 Laikari .................. G16H 40/67 700/91
2012/0317064 A1* 12/2012 Hagiwara ........... A61B 5/6898 706/46
2013/0073532 A1* 3/2013 Bachar ................ G06F 16/2308 707/704
2013/0138716 A1* 5/2013 Macwan ................ G06Q 30/02 340/539.11
2013/0183926 A1* 7/2013 Lindberg .............. H04W 24/00 455/405
2013/0238544 A1* 9/2013 Kunjithapatham .......................... G06F 16/9535 706/45
2013/0290359 A1* 10/2013 Eronen ............... G06F 16/9535 707/E17.014
2013/0297547 A1* 11/2013 Ding ................. H04M 1/72448 706/46
2014/0031060 A1* 1/2014 Bensley ................... G06N 5/04 455/456.1
2014/0052475 A1* 2/2014 Madan ................... G16H 50/30 705/3
2014/0053261 A1* 2/2014 Gupta ................. H04L 63/1425 717/171
2014/0357247 A1* 12/2014 Assuncao ......... H04M 1/72454 455/418

FOREIGN PATENT DOCUMENTS

CN 101815261 A 8/2010
CN 102542482 A 7/2012
KR 20100081177 A * 7/2010 ............ H04W 64/00
KR 101578428 B1 * 12/2015
WO 2011141761 A1 11/2011

OTHER PUBLICATIONS

NPL—Fulk; Fulk et.al, "Using Sensors to Measure Activity in People with Stroke", Top Stroke Rehabil. 2011 ; 18(6): 746-757. doi: 10.1310/tsr1806-746. (Year: 2011).*

Kwapisz, et. al, "Activity Recognition using Cell Phone Accelerometers", SIGKDD Explorations vol. 12, Issue 2, Jul. 25, 2010 (Year: 2010).*

Frank et al., "Generating Storylines From Sensor Data," Mobile Data Challenge 2012 (Nokia), Newcastle, UK (Jun. 18-19, 2012).

Froehlich et al., "MyExperience: A System for In situ Tracing and Capturing of User Feedback on Mobile Phones," MobiSys'07, Proceedings of the 5th International Conference on Mobile Systems, Applications, and Services, San Juan, Puerto Rico, pp. 57-70, Association for Computer Machinery, New York, New York (Jun. 13, 2007).

Hossmann et al., "Collecting Big Datasets of Human Activity One Checkin at a Time," HotPlanet'12, Proceedings of the 4th ACM International Workshop on Hot Topics in Planet-Scale Measurement, Lake District, UK, pp. 15-20, Association for Computer Machinery, New York, New York (Jun. 25, 2012).

* cited by examiner 601
602
Receiver
Processor

METHOD AND TERMINAL FOR GENERATING TERMINAL LOG BY INTEGRATION OF ELECTRONIC SENSOR DATA ACQUIRED BY THE TERMINAL

CROSS-REFERENCE TO RELATED APPLICATIONS

This application is a continuation of U.S. patent application Ser. No. 14/104,822, filed on Dec. 12, 2013, which is a continuation of International Patent Application No. PCT/CN2013/074191, filed on Apr. 15, 2013, which claims priority to Chinese Patent Application No. 201210363473.9, filed on Sep. 26, 2012, All of the afore-mentioned patent applications are hereby incorporated by reference in their entireties.

TECHNICAL FIELD

The present invention relates to the field of communication technologies, and in particular, to a method for generating a terminal log and a terminal.

BACKGROUND

With the popularity of smart terminals, a user may record activities and events within a period of time by using a smart terminal.

In the prior art, a smart terminal can generate a user log by collecting information such as terminal use records, working records, and life records of a user every day, and performing relevant text processing.

In a process of implementing embodiments of the present invention, the inventors find that content of the user log generated by the terminal cannot accurately record activities or events of the user.

SUMMARY

Embodiments of the present invention provide a method for generating a terminal log and a terminal, for accurately obtaining an activity or event of a user.

In a first aspect, an embodiment of the present invention provides a method for generating a terminal log, including:

obtaining sensor information and/or use information of a mobile terminal;

generating first log information according to the sensor information and/or the use information;

receiving second log information input by a user; and combining the first log information with the second log information to generate terminal log information.

With reference to the first aspect, the combining the first log information with the second log information to generate terminal log information includes:

generating the terminal log information according to a time sequence and/or content correlation of content recorded by the first log information and the second log information.

After the generating first log information according to the sensor information and/or the user use information, the method further includes:

receiving modification information input by the user; and updating the first log information according to the modification information.

The sensor information includes any one of the following information or a combination of multiple of the following information: acceleration information of the terminal, location information of the terminal, and direction information of the terminal.

The use information includes any one type of the following information or a combination of multiple types of the following information: call record information, short message record information, network connection information of the terminal, and system process information of the terminal.

The generating first log information according to the sensor information and/or the user use information includes: obtaining an activity and/or an event of the user by performing analysis using a set analysis policy according to the sensor information and/or the user use information; and generating the first log information for describing the activity and/or the event of the user by using a set generation policy according to the activity and/or the event of the user obtained by performing the analysis using the set analysis policy.

After the updating the first log information according to the modification information, the method further includes:

comparing the modification information with the first log information before the updating; and adjusting the set analysis policy according to a result of the comparing, and/or adjusting the generation policy according to a result of the comparing.

In a second aspect, the present invention provides a terminal, including:

an obtaining module, configured to obtain sensor information and/or use information of the terminal;

a generating module, configured to generate first log information according to the sensor information and/or the use information;

a first receiving module, configured to receive second log information input by a user; and a combining module, configured to combine the first log information with the second log information to generate terminal log information.

With reference to the second aspect, the combining module is configured to generate the terminal log information according to a time sequence and/or content correlation of content recorded by the first log information and the second log information.

With reference to the second aspect, the terminal further includes:

a second receiving module, configured to receive modification information input by the user; and an updating module, configured to update the first log information according to the modification information.

The sensor information that the obtaining module is configured to obtain includes any one of the following information or a combination of multiple of the following information: acceleration information of the terminal, location information of the terminal, and direction information of the terminal.

The user use information that the obtaining module is configured to obtain includes any one of the following information or a combination of multiple of the following information: call record information, short message record information, network connection information of the terminal, and system process information of the terminal.

The generating module is configured to obtain an activity and/or an event of the user by performing analysis using a set analysis policy according to the sensor information and/or the user use information; and generating the first log information for describing the activity and/or the event of the user by using a set generation policy according to the activity and/or the event of the user obtained by performing analysis.

With reference to the second aspect, the terminal further includes:

a comparing module, configured to compare the modification information with the first log information before the updating; and an adjusting module, configured to adjust the set analysis policy according to a result of the comparing, and/or adjust the generation policy according to a result of the comparing.

In a third aspect, the present invention provides a terminal, including:

a receiver, configured to obtain sensor information and/or use information of the terminal; and configured to receive second log information input by a user; and a processor, configured to generate first log information according to the sensor information and/or the use information; and configured to combine the first log information with the second log information to generate terminal log information.

With reference to the third aspect, the processor is configured to generate the terminal log information according to a time sequence and/or content correlation of content recorded by the first log information and the second log information.

The receiver is further configured to receive modification information input by the user; and the processor is further configured to update the first log information according to the modification information.

The sensor information that the receiver is configured to obtain includes any one of the following information or a combination of multiple of the following information: acceleration information of the terminal, location information of the terminal, and direction information of the terminal.

The user use information that the receiver is configured to obtain includes any one of the following information or a combination of multiple of the following information: call record information, short message record information, network connection information of the terminal, and system process information of the terminal.

The processor is configured to obtain an activity and/or an event of the user by performing analysis using a set analysis policy according to the sensor information and/or the user use information; and generating the first log information for describing the activity and/or the event of the user by using a set generation policy according to the activity and/or the event of the user obtained by performing the analysis using the set analysis policy.

The processor is further configured to compare the modification information with the first log information before the updating; and configured to adjust the set analysis policy according to a result of the comparing, and/or adjust the generation policy according to a result of the comparing.

In the embodiments of the present invention, the terminal, by obtaining sensor information and/or user use information and combining a log generated by the terminal with a log written by a user, ensures that an activity or event of the user is accurately obtained.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
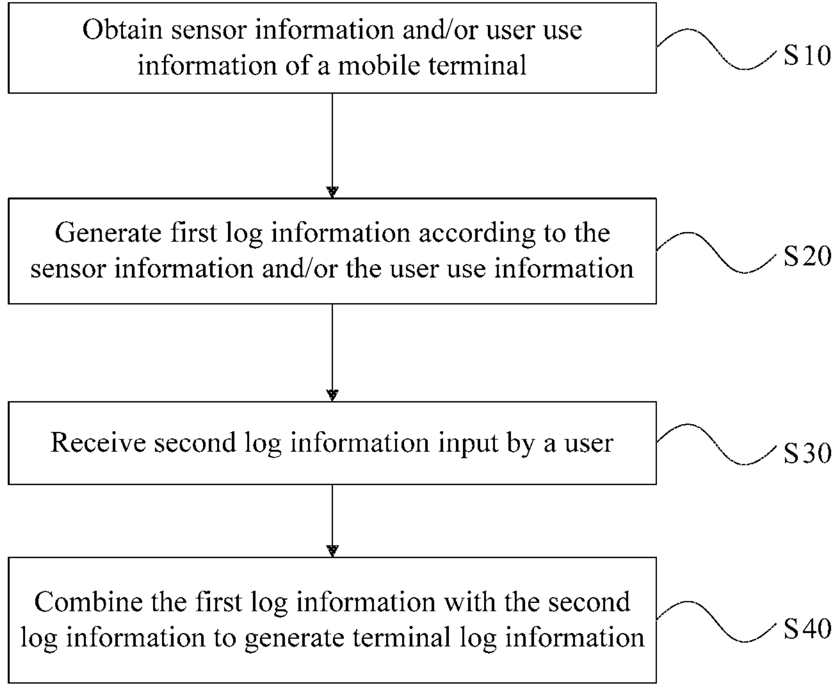
FIG. 1 is a schematic flowchart of Embodiment 1 of a method for generating a terminal log according to the present invention.

FIG. 1 is a schematic flowchart of Embodiment 1 of a method for generating a terminal log according to the present invention. As shown in FIG. 1, the method includes the following:

S10. Obtain sensor information and/or user use information of a mobile terminal.

The sensor information may include any one type of the following information or a combination of multiple types of the following information: acceleration information of the terminal, location information of the terminal, and direction information of the terminal, but is not limited thereto. It should be noted that the sensor information may be obtained by the mobile terminal by using various sensors configured thereon, such as a Global Positioning System (GPS) sensor and an acceleration sensor. In a specific implementation process, each type of information described above is recorded in a specific format. For example, location information at a time point obtained in the GPS sensor may be represented as {time, longitude, latitude, altitude}. Acceleration information at a time point obtained in the acceleration sensor may be represented as {time, x-axis acceleration, y-axis acceleration, z-axis acceleration}.

The user use information may include any one type of the following information or a combination of multiple types of the following information: user call record information, user short message record information, network connection information of the terminal, and system process information of the terminal, but is not limited thereto. The obtained user call record information may include call start time, call end time, call duration, calling number, called number, and the like. The obtained short message record information may include short message receiving time, length of a received short message, short message sending time, length of a sent short message, and the like. The obtained network connection information may include a connection situation where the mobile terminal is connected to a wireless access point or a base station by using a Wireless Fidelity (Wi-Fi) network or a third generation (3G) communication technology network, and may specifically be an ID, a name, signal strength of a Wi-Fi node or 3G node, and the like. The system process information may include a process that the mobile terminal is running and resource usage of the process, such as a central processing unit (CPU) and a memory. The mobile terminal here performs recording according to a specific operation of a user and by using a specified format. For example, each piece of user call record information may be represented as {time, local mobile phone state, peer mobile phone state, local mobile phone setting state, peer mobile phone ID}. A more specific piece of call record information may be {time, call received, calling, mobile phone ringing, peer mobile phone ID}.

S20. Generate first log information according to the sensor information and/or the user use information.

The terminal may obtain an activity or an event of the user by performing analysis using a set analysis policy according to the sensor information and/or the user use information. The analysis policy here may be pattern recognition, machine learning, rule setting, and the like, but is not limited thereto. Taking an acceleration sensor as an example, the terminal obtains acceleration sensor information {time 1, x1, y1, z1}, {time 2, x2, y2, z2}, {time 3, x3, y3, z3}, . . . by using the acceleration sensor; and uses a specific algorithm to recognize {start time 1, end time 1: action 1, action 2}, {start time 2, end time 2: action 1, action 2}, {start time 3, end time 3: action 1, action 2}, . . . that is, the acceleration sensor information is recognized, depending on the magnitude of acceleration within a period of time, as a specific action such as walking, running, jumping, and the like. Finally, according to a predefined rule, a result that "xxx is running between 9:00 to 9:15 in the morning" may be obtained. It should be noted that a speed range may be set in the predefined rule. For example, when the moving acceleration of a user is between x $m/s^2$ and y $m/s^2$, it may be deemed that the user is running; however, the present invention is not limited thereto.

Furthermore, the terminal may also generate, according to the activity and/or the event of the user obtained by performing analysis and by using a set generation policy, the first log information for describing the activity and/or the event of the user. A rule may be predefined in the generation policy according to the requirements of the user, thereby combining and filtering the obtained activity and/or event information. For example, in the process mentioned above, information "the user keeps walking between 8:00 and 9:00 in the morning" may be obtained. Such information having no actual meaning may be deleted when a log is generated. Moreover, analysis is performed according to time information. The information within the same period of time is combined according to the comprehensiveness of the sensor information and the user use information. For example, according to the comprehensiveness of the information obtained from the acceleration sensor and the user call information, it is determined that "xxx1 talks with xxx2 between 9:00 and 9:30, and xxx1 is exercising intensely, and may probably be running according to the acceleration sensor".

S30. Receive second log information input by a user.

Specifically, the user may write a log on the mobile terminal, which may include a text, an image, and the like.

S40. Combine the first log information with the second log information to generate terminal log information.

That is, the log automatically generated by the mobile terminal and the log written by the user are combined after correlation analysis, where the terminal log information may be generated according to a time sequence and/or content correlation of content recorded by the first log information and the second log information.

For example, first log information generated automatically by the terminal is "the mobile phone is muted between 9:00 and 9:50 on Sep. 1, 2012. xxx calls at 9:40 with no answer". Second log information written by the user is "participate in a weekly routine meeting between 9:00 and 10:00 today". After a combination, the obtained terminal log information is "participate in the weekly routine meeting between 9:00 and 10:00 today, and the mobile phone is muted between 9:00 and 9:50. xxx calls at 9:40 with no answer".

It should be noted that the log information generated by the mobile terminal is generally a state or an action of the user at a time point, and the log written by the user generally records content within a period of time. In a combination process, a priority may be set so that the log written by the user is prior in the automatic combination process.

In the embodiment, the mobile terminal, by obtaining related sensor information and/or user use information and combining a log generated by the terminal with a log written by a user, ensures that an activity or event of the user is accurately obtained.

In addition, the terminal may also, after generating the first log information according to the sensor information and/or the user use information, update the first log information according to a received modification input by the user.

In a specific implementation process, the mobile terminal may display the generated first log information to the user, and the user may edit and modify the first log information according to a specific situation, to generate the updated first log information. The log may be classified, for example, be classified into a sport log and a health log, for the user to view conveniently.

In addition, after the first log information is updated according to the modification information, the modification information is compared with the first log information before the updating.

The set analysis policy is adjusted according to a result of the comparing, and/or the generation policy is adjusted according to a result of the comparing.

For example, first log information generated by the mobile terminal is "walking from 9:00 to 10:00 in the morning", and the user modifies it to "jogging from 9:00 to 9:30 in the morning, and walking from 9:30 to 10:00". The reason may be that a speed range set for walking may be too large. Then, the mobile terminal may adjust, according to the modified log information, the speed range for determining that the user is walking, which is set in the analysis policy.

It should be noted that when the first log information and the second log information are combined, the first log information that is updated and modified by the user may be used.

Figure 2:
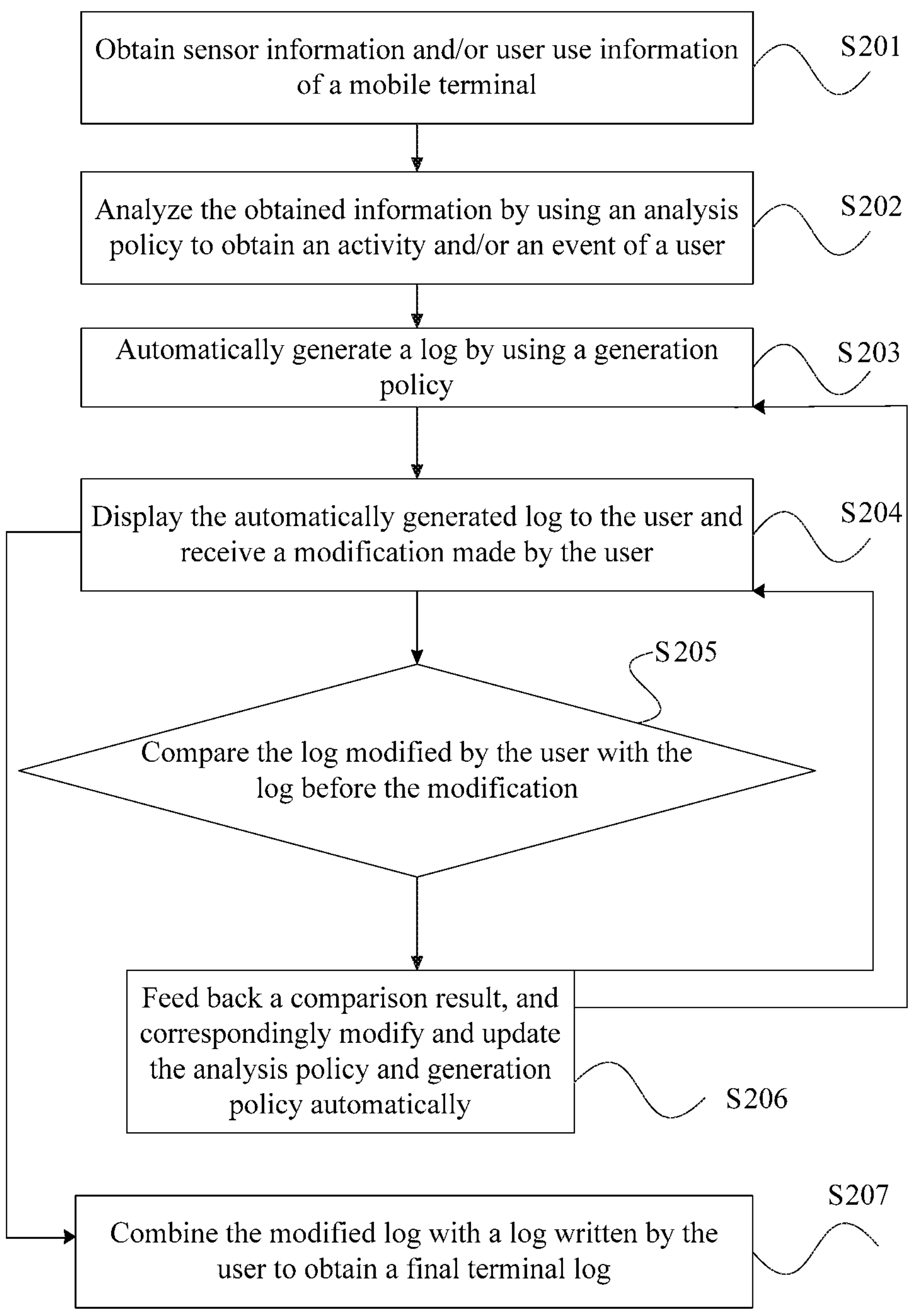
FIG. 2 is a schematic flowchart of Embodiment 2 of a method for generating a terminal log according to the present invention.

FIG. 2 is a schematic flowchart of Embodiment 2 of a method for generating a terminal log according to the present invention. As shown in FIG. 2, according to the description of the foregoing embodiment, the whole process of the method is as follows:

S201. Obtain sensor information and/or user use information of a mobile terminal.

S202. Analyze the obtained information by using an analysis policy to obtain an activity and/or an event of a user.

S203. Automatically generate a log by using a generation policy. According to the result of the above analysis, generate the log automatically.

S204. Display the automatically generated log to the user and receive a modification made by the user.

S205. Compare the log modified by the user with the log before the modification.

S206. Feed back a result of the comparing, and correspondingly modify and update the analysis policy and the generation policy automatically.

S207. Combine the modified log with a log written by the user to obtain a final terminal log.

It should be noted that the execution process described above is not fixed, where if the user does not modify the automatically generated log, no comparison is required; and if the user does not write a log, no combination processing is required, and the final terminal log may be directly obtained.

In the embodiment, the mobile terminal may automatically generate a log by obtaining related sensor information and user use information, accept the editing and modification made by the user, and combine the log with a log written by the user, which not only reduces the time for the user to write a log, but also achieves accurate obtaining of an activity or event of the user. In addition, by comparing the information before and after the user makes the modification, the set analysis policy and generation policy are automatically adjusted, which can continuously improve the accuracy of obtaining the activity or the event of the user.

Figure 3:
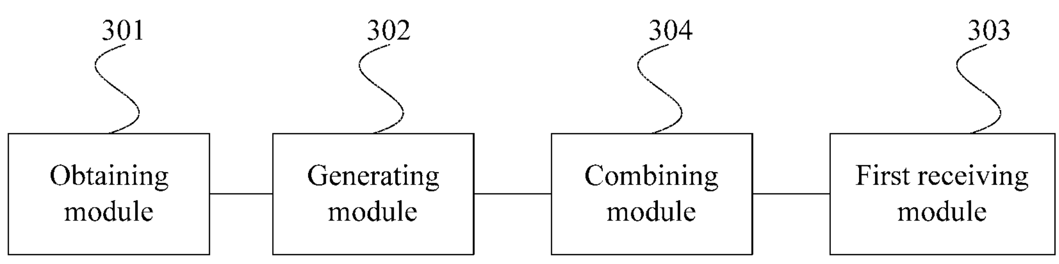
FIG. 3 is a schematic structural diagram of Embodiment 1 of a terminal according to the present invention.

FIG. 3 is a schematic structural diagram of Embodiment 1 of a terminal according to the present invention. As shown in FIG. 3, the terminal includes an obtaining module 301, a generating module 302, a first receiving module 303, and a combining module 304.

The obtaining module 301 is configured to obtain sensor information and/or user use information of a mobile terminal.

The generating module 302 is configured to generate first log information according to the sensor information and/or the user use information.

The first receiving module 303 is configured to receive second log information input by a user.

The combining module 304 is configured to combine the first log information with the second log information to generate terminal log information.

Specifically, the sensor information that the obtaining module 301 is configured to obtain includes any one type of the following information or a combination of multiple types of the following information: acceleration information of the terminal, location information of the terminal, and direction information of the terminal. The user use information that the obtaining module 301 is configured to obtain includes any one type of the following information or a combination of multiple types of the following information: user call record information, user short message record information, network connection information of the terminal, and system process information of the terminal.

The combining module 304 is configured to generate the terminal log information according to a time sequence and/or content correlation of content recorded by the first log information and the second log information.

For operations of the modules, refer to the foregoing method embodiments, which will not be described repeatedly herein.

In the embodiment, the terminal generates a first log by using information obtained by the obtaining module, and then combines, by using the combining module, the first log with a log written by the user, so that an activity or event of the user can be accurately obtained.

In addition, the generating module 302 is specifically configured to obtain an activity and/or an event of the user by performing analysis using a set analysis policy according to the sensor information and/or the user use information; and according to the activity and/or the event of the user obtained by performing analysis, generate, by using a set generation policy, the first log information for describing the activity and/or the event of the user.

Figure 4:
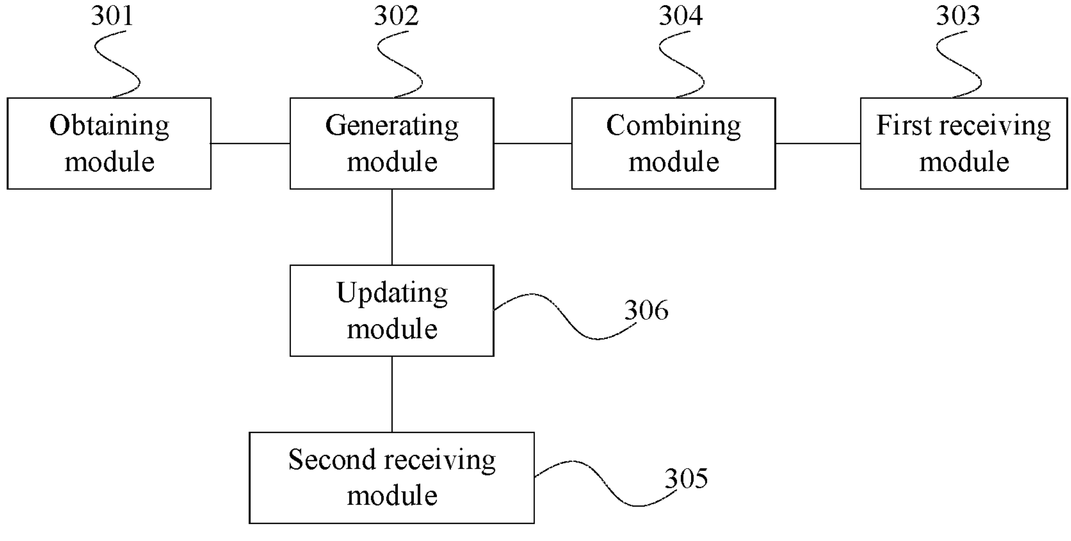
FIG. 4 is a schematic structural diagram of Embodiment 2 of a terminal according to the present invention.

FIG. 4 is a schematic structural diagram of Embodiment 2 of a terminal according to the present invention. As shown in FIG. 4, on the basis of FIG. 3, the terminal further includes a second receiving module 305 and an updating module 306.

The second receiving module 305 is configured to receive modification information input by the user.

The updating module 306 is configured to update the first log information according to the modification information.

For operations of the modules, refer to the foregoing method embodiments, which will not be described repeatedly herein.

Figures 5, 6:
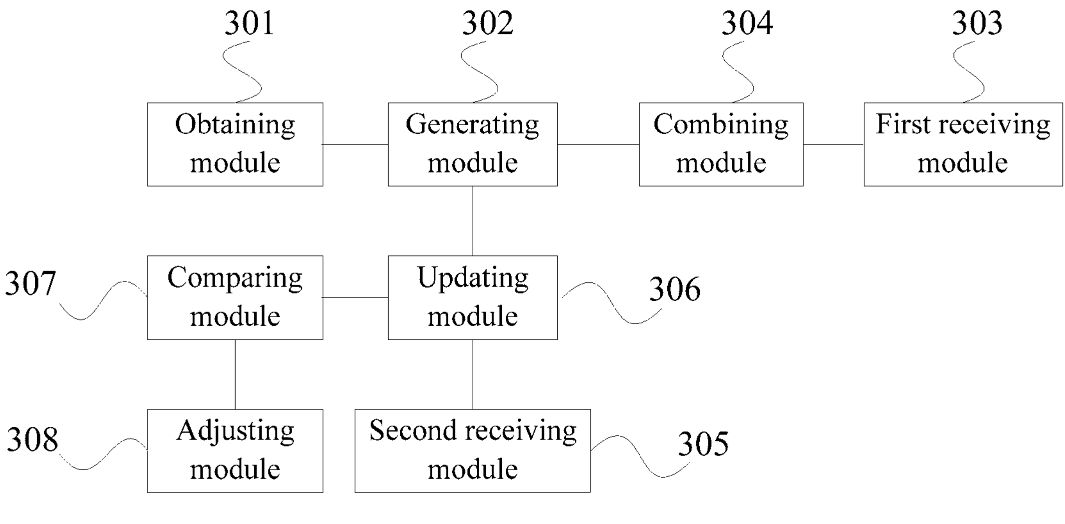
FIG. 5 is a schematic structural diagram of Embodiment 3 of a terminal according to the present invention.
FIG. 6 is a schematic structural diagram of Embodiment 1 of another terminal according to the present invention.

FIG. 5 is a schematic structural diagram of Embodiment 3 of a terminal according to the present invention. As shown in FIG. 5, on the basis of FIG. 4, the terminal further includes a comparing module 307 and an adjusting module 308.

The comparing module 307 is configured to compare the modification information with the first log information before the updating.

The adjusting module 308 is configured to adjust the set analysis policy according to a result of the comparing, and/or adjust the generation policy according to a result of the comparing.

For operations of the modules, refer to the foregoing method embodiments, which will not be described repeatedly herein.

In the embodiment, the terminal, on the basis of automatically generating a log, may also receive modification information of the user; the updating module thereof may update the automatically generated log according to the modification information; and in combination with a log written by the user, an activity or event of the user can be accurately obtained. In addition, the comparing module compares the information before and after the user makes the modification, and the adjusting module automatically adjusts the set analysis policy and generation policy, which can continuously improve the accuracy of obtaining the activity or the event of the user.

FIG. 6 is a schematic structural diagram of another terminal according to Embodiment 1 of the present invention. As shown in FIG. 6, the terminal includes a receiver 601 and a processor 602.

The receiver 601 is configured to obtain sensor information and/or user use information of a mobile terminal; and configured to receive second log information input by a user.

The processor 602 is configured to generate first log information according to the sensor information and/or the user use information; and configured to combine the first log information with the second log information to generate terminal log information.

In a specific implementation process, the processor 602 is specifically configured to generate the terminal log information according to a time sequence and/or content correlation of content recorded by the first log information and the second log information.

Specifically, the following operations may be performed: obtaining an activity and/or an event of the user by performing analysis using a set analysis policy according to the sensor information and/or the user use information; and generating the first log information for describing the activity and/or the event of the user by using a set generation policy according to the activity and/or the event of the user obtained by performing analysis.

The sensor information that the receiver 601 is configured to obtain includes any one type of the following information or a combination of multiple types of the following information: acceleration information of the terminal, location information of the terminal, and direction information of the terminal.

The user use information that the receiver 601 is configured to obtain includes any one type of the following information or a combination of multiple types of the following information: user call record information, user short message record information, network connection information of the terminal, and system process information of the terminal.

For specific operations of the receiver and processor, refer to the foregoing method embodiments, which will not be described repeatedly herein.

In the embodiment, the terminal generates a first log by using information obtained by the receiver, and then combines, by using the processor, the first log with a log written by the user, so that an activity or event of the user can be accurately obtained.

In addition, the receiver 601 is further configured to receive modification information input by the user, and the processor 602 is further configured to update the first log information according to the modification information.

In a specific implementation process, the processor 602 is further configured to compare the modification information with the first log information before the updating; and configured to adjust the set analysis policy according to a result of the comparing, and/or adjust the generation policy according to a result of the comparing.

For specific operations of the receiver and processor, refer to the foregoing method embodiments, which will not be described repeatedly herein.

In the embodiment, the terminal, on the basis of automatically generating a log, may use the receiver to further receive modification information of the user; the processor thereof may update the automatically generated log according to the modification information; and in combination with a log written by the user, it is ensured that an activity or event of the user is accurately obtained. In addition, the processor further automatically adjusts the set analysis policy and generation policy by comparing the information before and after the user makes the modification, which can continuously improve the accuracy of obtaining the activity or event of the user.

Persons of ordinary skill in the art may understand that, all or a part of the steps in each of the foregoing method embodiments may be implemented by a program instructing relevant hardware. The aforementioned program may be stored in a computer readable storage medium. When the program runs, the steps of the foregoing method embodiments are performed. The foregoing storage medium includes any medium capable of storing program codes, such as a ROM, a RAM, a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

What is claimed is:

1. A method for generating a terminal log for a mobile terminal including an acceleration sensor, the method comprising:

obtaining an information of a mobile terminal comprising:
- a sensor information comprising an acceleration information rendered by the acceleration sensor, and
- a use information of the mobile terminal;

obtaining, by performing analysis using a set analysis policy, a physical activity description for a physical activity carried out by a user of the mobile terminal according to the information of the mobile terminal, wherein performing analysis using the set analysis policy comprises:
- performing an analysis according to a time information, and
- combining the sensor information, and the use information within a same period of time to obtain the physical activity description;

generating, using a set generation policy and the physical activity description, a first log information describing the physical activity;

receiving a user-input second log information, wherein the second log information comprises a user-directly-input log comprising a text or an image; and generating a terminal log information describing physical activity descriptions by combining the first log information describing the physical activity with the second log information according to both:
- a time sequence correlation of content recorded by the first log information and the second log information, and
- a content correlation of content recorded by the first log information and the second log information.

2. The method according to claim 1, wherein after generating the first log information according to the at least one of the sensor information and the use information, the method further comprises:

receiving a user-input modification information; and updating the first log information according to the user-input modification information.

3. The method according to claim 1, wherein the sensor information further comprises any one or more type of information taken from the group consisting of:

location information of the terminal, and direction information of the terminal.

4. The method according to claim 1, wherein the use information comprises any one or more type of information taken from the group consisting of:

call record information, short message record information, network connection information of the terminal, and system process information of the terminal.

5. The method according to claim 2, wherein after updating the first log information according to the user-input modification information, the method further comprises:

comparing the user-input modification information with the first log information before the updating; and adjusting at least one of the set analysis policy and the set generation policy according to a result of the comparing.

6. A mobile terminal, comprising:

a sensor providing a sensor information, wherein the at least one sensor includes an acceleration sensor providing acceleration information;

a processing hardware; and a non-transitory computer-readable medium comprising computer-executable instructions that, when executed by the processing hardware, cause the mobile terminal to:

obtain an information of a mobile terminal comprising:

the sensor information comprising an acceleration information rendered by the acceleration sensor, and a use information of the mobile terminal;

obtain, by performing analysis using a set analysis policy, a physical activity description for a physical activity carried out by a user of the mobile terminal according to the information of the mobile terminal, wherein performing analysis using the set analysis policy comprises:

perform an analysis according to a time information, and combine the sensor information, and the use information within a same period of time to obtain the physical activity description;

generate, using a set generation policy and the physical activity description, a first log information describing the physical activity;

receive a user-input second log information, wherein the second log information comprises a user-directly-input log comprising a text or an image; and generate a terminal log information describing physical activity descriptions by combining the first log information describing the physical activity with the second log information according to a time sequence correlation of content recorded by the first log information and the second log information and a content correlation of content recorded by the first log information and the second log information.

7. The mobile terminal according to claim 6, wherein after generating the first log information according to the at least one of the sensor information and the use information, the mobile terminal is further caused to:

receive user-input modification information and update the first log information according to the user-input modification information.

8. The mobile terminal according to claim 6, wherein the sensor information further comprises any one or more types of information taken from the group consisting of:

location information of the terminal, and direction information of the terminal.

9. The mobile terminal according to claim 6, wherein the use information comprises any one or more type of information taken from the group consisting of:

call record information, short message record information, network connection information of the terminal, and system process information of the terminal.

10. The mobile terminal according to claim 7, wherein the mobile terminal is further caused to:

compare the user-input modification information with the first log information before the updating; and adjust at least one of the set analysis policy and the set generation policy according to a result of the comparing.

11. A non-transitory computer-readable medium comprising computer-executable instructions that, when executed by a processing hardware, cause a mobile terminal including an acceleration sensor providing acceleration information to:

obtain an information of a mobile terminal comprising:

the sensor information comprising an acceleration information rendered by the acceleration sensor, and a use information of the mobile terminal;

obtain, by performing analysis using a set analysis policy, a physical activity description for a physical activity carried out by a user of the mobile terminal according to the information of the mobile terminal, wherein performing analysis using the set analysis policy comprises:

perform an analysis according to a time information, and combine the sensor information, and the use information within a same period of time to obtain the physical activity description;

generate, using a set generation policy and the physical activity description, a first log information describing the physical activity;

receive a user-input second log information, wherein the second log information comprises a user-directly-input log comprising a text or an image; and generate a terminal log information describing physical activity descriptions by combining the first log information describing the physical activity with the second log information according to a time sequence correlation of content recorded by the first log information and the second log information and a content correlation of content recorded by the first log information and the second log information.

12. The non-transitory computer-readable medium of claim 11, wherein after generating the first log information according to the at least one of the sensor information and the use information, the mobile terminal is further caused to:

receive user-input modification information; and update the first log information according to the user-input modification information.

13. The non-transitory computer-readable medium of claim 11, wherein the sensor information further comprises any one or more types of information taken from the group consisting of:

location information of the terminal, and direction information of the terminal.

14. The non-transitory computer-readable medium of claim 11, wherein the use information comprises any one or more type of information taken from the group consisting of:

call record information, short message record information, network connection information of the terminal, and system process information of the terminal.

15. The non-transitory computer-readable medium of claim 12, wherein the mobile terminal is further caused to:

compare the user-input modification information with the first log information before the updating; and adjust at least one of the set analysis policy and the set generation policy according to a result of the comparing.

* * * * *